Patented Oct. 6, 1942

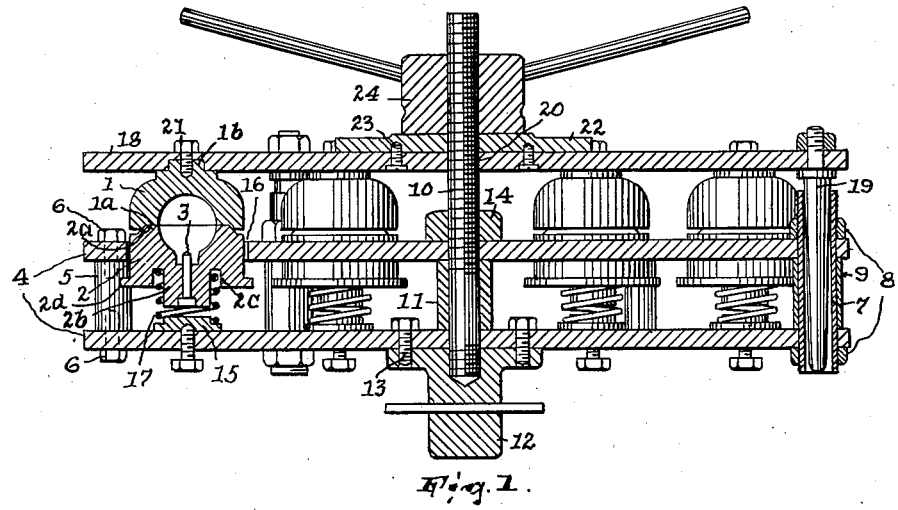

2,298,057

UNITED STATES PATENT OFFICE 2,298,057

MOLD STRUCTURE

Gustav R. Kelm, Paterson, N. J.

Application February 14, 1940, Serial No. 318,819

8 Claims. (Cl. 18—34)

This invention relates to molding appliances and particularly molding appliances including a plurality of actual molds and to be placed in a heated space, as in my application Serial No. 320,351, now Patent No. 2,262,143, or where the substance to be molded is latex or the like requiring to be cured.

According to my invention a crate or frame is provided including two main sections to each of which one section of each mold is attached in such position as precisely to coincide with the other section of the mold when the two crate sections are assembled. Since the appliance is to be manually placed in or removed from the curing chamber it should be as light as possible in construction, wherefore the main parts of the crate consist of metal plates, preferably disks. Being plates and hence relatively thin, as an incident of possible warping in the curing chamber there might result failure of the sections of some of the molds to remain in perfect sealing relation to each other. My invention therefore further contemplates so mounting one section of each mold in its crate section as to permit it to respond to angular displacement which the mating mold section may undergo as an incident of the warping affecting the plate to which the latter mold-section is attached.

In the drawing,

Fig. 1 is a diametric section of the appliance; and

Fig. 2 is a plan thereof.

Each mold comprises two sections 1 and 2, the upper section 1 having around its mold space a depressed seat 1a and the lower mold section a projecting flange or lip 2a to fit snugly said seat or form therewith substantially an hermetic joint. The upper mold section has an axial upstanding lug 1b and the lower mold section an axial depending lug 2b, surrounded by a groove 2c, and a basal peripheral flange 2d; the article to be formed being in this example a syringe bulb, 3 designates a removable axial pin in the latter section for developing the bore in the bulb-neck.

The lower crate section or base structure 4 designates two circular metal plates or disks secured together in parallel planes as follows: In three equidistant radii and between the disks are spacers 5 to which the disks are secured by screws 6. In three other radii alternating with and equidistant from the first radii tubular bolts 7 penetrate the disks and have screwed thereon nuts 8 acting to clamp the disks against tubular spacers 9 arranged between the disks and in telescoped relation to the bolts 7. The latter project upwardly somewhat above what appears as the upper disk. There is a central upstanding spindle 10 screwed into both disks and preferably a central spacer 11 between them and also screwed into a central stud 12 secured by screws 13 to and depending from the lower disk, which stud is to fit a socket in a holder for supporting the appliance in the curing chamber, as in my said application; 14 is a lock-nut screwed on the spindle and bearing against the top disk.

In concentric circles the lower disk has bosses 15 secured on its upper face; in registry with them the upper disk has openings 16 of greater diameter than the bodies but less diameter than the flanges 2d of the lower mold sections. The lower mold sections being positioned as shown in these openings, interposed between them and the bosses 15 are helical springs 17. In the absence of downward pressure on these mold-sections they will be raised by the springs to the limit determined by contact of their flanges with the upper disk; when they are depressed the openings 16 permit them some tilting, universally.

The upper crate section or structure includes a body section 18 having in exact registry with the respective bolts 7 depending somewhat tapered long stems 19. It also has a central hole 20 to receive the spindle 10. The upper mold sections 1 are secured to the crate section 18 by screws 21 so that, when the two crate sections are assembled, the upper mold sections may respectively coincide with the lower mold sections. The central part of the disk forming the upper crate section may be re-enforced by a disk 22 held thereto by screws 23.

24 is a nut having radial handles and screwed on the spindle above the upper crate section, whereby to clamp the two crate sections together and thus hold the upper and lower mold sections pressing against each other.

For charging each lower mold section with the necessary quantum of latex or the like the lower crate section has its depending stud 12 set in a fixed socket or held in a vise. Thereupon the unit formed by the upper crate section and its carried mold sections is assembled with the unit formed by the lower crate section and its mold sections and they are clamped together by the simple operation of applying a screwing effort to the single nut 24. In the assembling the upper mold sections should come to register truly with the lower mold sections to avoid their burring each other at their mouths, thus destroying the seal which should be maintained between them. It is to avoid all possibility in this respect that the two units are provided with telescopic means (the tubular bolts 7 and stems 19) coactive, in the assembling, to confine the upper unit to that relation to the lower one in which the upper and lower mold sections directly register with each other, at least as the upper mold sections are about to seat, it being noted that the stems 19 are tapered so that their points will freely enter the bores of the bolts whereas near their butts or adjoining the upper crate section they are formed to fit the bores of the bolts quite snugly.

As indicated the disks are as light as possible and since the clamping action is effective on only a limited part of the area of the disk 18 and lower disk 4 warping of these disks under the heat of the curing chamber has to be taken into account as a factor tending to break the seal between upper and lower mold sections by relative tilting thereof. But with the springs and openings 16 present the two sections of any mold are free to tilt as a unit and they therefore remain in perfect sealing relation to each other. Said openings, however, are of somewhat less diameter than the flanges of the lower mold sections whereby, when the upper crate section is removed, the lower mold sections remain confined to the lower crate section.

Of course, for some other reason, there may be failure of the two supports or backing members formed by disk 18 and the lower disk 4 to hold the two sets of mold sections in sealing relation to each other unless some elastic means, such as the springs, were present to permit each lower section of one set to undergo angular displacement in any direction.

Having thus fully described my invention, what I claim is:

1. In a molding appliance, the combination of two spaced backing members one of which is a plate-like member and has one face thereof facing the other member, a hollow mold arranged between said members and divided in a plane extending approximately parallel with said face into two sections together forming a sealed joint, said mold being free to undergo universal tilting relatively to one member, elastic means between one member and one section of said mold and forming therewith a system to be compressed between said members, and means, connecting said members for urging them together and thereby compressing said system.

2. The combination set forth in claim 1 characterized by both members being plate-like.

3. In a molding appliance, the combination of a structure including two fixedly related plate-like members arranged in spaced substantially parallel planes and one having an opening therethrough facing the other member, a mold section arranged and universally tiltable in said opening and facing away from said other member, elastic supporting means interposed between said mold section and said other member, a second structure opposite said mold section and including a support and a mold section in fixed relation to said support, said second-named mold section being in registry, and coactive to form a mold space, with the first-named mold section, and releasable means, connecting said other member and said second structure, for urging them together and thereby holding the registering mold sections pressing against each other.

4. In a molding appliance, the combination of a structure including two fixedly related plate-like members arranged in spaced substantially parallel planes and one having an opening therethrough facing the other member, a mold section arranged and universally tiltable in said opening and facing away from said other member, elastic supporting means interposed between said mold section and said other member, a structure opposite said mold section and including a mold section in fixed relation to the second-named structure and in registry, and coactive to form a mold space, with the first-named mold section, and releasable means, connecting said other member and the second-named structure, for urging them together and thereby holding the registering mold sections pressing against each other, said first-named member limiting the movement of the first-named mold section from the second-named member when said releasable means is made to release the latter and said second-named structure.

5. In a molding appliance, the combination of a plate-like backing member, a number of universally tiltable mold sections facing away from said member and arranged in approximately equally spaced relation to each other around a common axis, elastic supporting means for said mold sections arranged between them and said member, another plate-like member opposite said mold sections, other mold sections in fixed relation to the latter member and in registry, and coactive to form mold spaces, with the respective first-named mold sections, and means including a spindle penetrating said members and having its axis coincident with said axis, for urging said members together and thereby holding the registering mold sections pressing against each other.

6. A molding appliance comprising two units, one of which includes a plurality of mold sections facing in a common direction and the other includes mold sections facing in the opposite direction and registering with and adapted to form mold spaces with the respective first-named mold sections, and means, connecting the two units, for urging them together and thereby holding the registering mold sections pressing against each other, one of each two registering mold sections being an independently tiltable part of the unit including it.

7. In a molding apparatus, the combination, with a base structure including upper and lower spaced members, spaced tubular elements rigidly connecting said members and an upwardly facing mold-section supported by the lower member, of an upwardly removable upper structure including a body portion, a mold section facing downwardly and contacting and forming with the first mold section a mold space, and downwardly extending stems telescoped into said elements and coacting therewith to confine the upper structure against lateral displacement relatively to the lower structure, one of said mold sections penetrating said upper member.

8. The combination set forth in claim 7 characterized by said stems being tapered.

GUSTAV R. KELM.